(12) United States Patent
Halladay et al.

(10) Patent No.: US 7,183,354 B2
(45) Date of Patent: *Feb. 27, 2007

(54) ROOM TEMPERATURE CURABLE FUNCTIONALIZED HNBR COATING

(75) Inventors: James R. Halladay, Harborcreek, PA (US); Frank J. Krakowski, Erie, PA (US); Ernest Barritt Troughton, Jr., Raleigh, NC (US)

(73) Assignee: Lord Corporation, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/094,203

(22) Filed: Mar. 8, 2002

(65) Prior Publication Data

US 2003/0152790 A1 Aug. 14, 2003

Related U.S. Application Data (63) Continuation-in-part of application No. 10/007,268, filed on Nov. 9, 2001, now Pat. No. 6,709,758.

(51) Int. Cl.
*B32B 27/08* (2006.01)

(52) U.S. Cl. ............ 525/102; 525/123; 525/154; 525/162; 525/163; 428/519; 428/501; 428/424.7; 428/424.8; 428/462; 428/447

(58) Field of Classification Search ........... 428/519, 428/501, 424.8, 424.7, 462, 447; 152/524, 152/525, 564, 529; 525/102, 123, 154, 162, 525/163

See application file for complete search history.

(56) References Cited

U.S. PATENT DOCUMENTS

| | | | |
|---|---|---|---|
| 2,941,966 A | 6/1960 | Campbell | |
| 4,321,394 A | 3/1982 | Schaffer et al. | |
| 4,452,950 A | 6/1984 | Wideman | |
| 4,553,377 A | 11/1985 | Klinkel | |
| 4,581,417 A | 4/1986 | Buding et al. | |
| 4,631,315 A | 12/1986 | Buding et al. | |
| 4,663,377 A | 5/1987 | Hombach et al. | |
| 4,774,288 A | 9/1988 | Ridland | |
| 4,795,788 A | 1/1989 | Himmler et al. | |
| 4,826,721 A | 5/1989 | Obrecht et al. | |
| 5,077,127 A * | 12/1991 | Mori | 428/390 |
| 5,202,377 A | 4/1993 | Thorne et al. | |
| 5,258,481 A | 11/1993 | Hesselmans et al. | |
| 5,314,741 A | 5/1994 | Roberts et al. | |
| 5,314,955 A | 5/1994 | Halladay | |
| 5,466,745 A | 11/1995 | Fiori et al. | |
| 5,612,418 A * | 3/1997 | Manley et al. | 525/222 |
| 5,998,539 A | 12/1999 | Morishima et al. | |
| 6,007,619 A | 12/1999 | Laas et al. | |
| 6,008,289 A | 12/1999 | Konig et al. | |
| 6,051,634 A | 4/2000 | Laas et al. | |
| 6,034,169 A | 5/2000 | Witkowski et al. | |
| 6,080,812 A | 6/2000 | Morishima et al. | |
| 6,087,439 A | 7/2000 | Ganster et al. | |
| 6,126,777 A | 10/2000 | Wang | |
| 6,139,675 A | 10/2000 | Druecke et al. | |
| 6,143,132 A | 11/2000 | Traubel et al. | |
| 6,153,690 A | 11/2000 | Larson et al. | |
| 6,221,995 B1 | 4/2001 | Yukio et al. | |
| 6,777,026 B2 * | 8/2004 | Halladay et al. | 427/180 |
| 2003/0104231 A1 | 6/2003 | Halladay et al. | |
| 2003/0105218 A1 | 6/2003 | Halladay et al. | |

FOREIGN PATENT DOCUMENTS

WO WO 94/13723 6/1994

* cited by examiner

*Primary Examiner*—Margaret G. Moore
(74) *Attorney, Agent, or Firm*—Todd W. Galinski (57) ABSTRACT

The coating for substrates or materials, preferably elastomers or elastomers bonded to metal. The coating composition comprises (a) a functionalized hydrogenated copolymer comprising at least one repeat unit derived from a conjugated diene monomer; preferably including an unsaturated nitrile monomer; and a functional group containing monomer or graft linked compound or combinations thereof; (b) a curing component comprising at least one isocyanate group, or a carbodiimide compound, or an amino resin, or combinations thereof, and (c) a solvent. The coating compounds can be applied to an substrate either before or after the substrate has been vulcanized. The coatings can be cured at ambient temperatures.

41 Claims, 1 Drawing Sheet
(1 of 1 Drawing Sheet(s) Filed in Color)

FIG. 1

ROOM TEMPERATURE CURABLE FUNCTIONALIZED HNBR COATING

CROSS REFERENCE

This application is a continuation-in-part of U.S. Ser. No. 10/007,268, filed Nov. 9, 2001, now U.S. Pat. No. 6,709,758, issued Mar. 23, 2004 entitled "Room Temperature Curable X-HNBR Coating.

FIELD OF THE INVENTION

The present invention relates to exterior coatings on the surface of elastomeric articles and materials. In addition to providing protective properties such as oil, solvent, and ozone resistance to the substrate, the coatings can also impart desirable aesthetic qualities such as transparency, color, and gloss. Advantageously, the coatings can be applied to an elastomeric substrate either before or after the substrate has been vulcanized.

BACKGROUND OF THE INVENTION

Elastomeric materials are utilized in numerous industrial applications. For example, elastomeric materials are utilized in the manufacture of tires, hoses, seals, mounting, damping and insulating devices, to name a few. These and other articles have established uses in automotive parts, such as in the engine compartments of automobiles and other vehicles, for example engine mounts, hoses, shrouds, seals, grommets, washers, spacers, covers, and housings, etc. In addition, devices for mounting the engines within these vehicles typically comprise one or more metal parts adhesively bonded to one or more vulcanized elastomeric parts. In these and many other industrial applications utilizing vulcanized or thermoplastic elastomeric materials, the elastomeric materials are typically exposed to degradative elements such as various solvents, oils, fuels and ozone. Elastomeric materials have a tendency to degrade when exposed to these types of materials, and there is a continuing search within industry to provide elastomer articles that are resistant to degradative elements.

One method of rendering elastomeric materials resistant to corrosive materials is to apply a protective coating to the elastomeric material. Various corrosion-resistant coatings previously utilized for both flexible substrates (e.g., elastomeric substrates) and rigid substrates (e.g., steel, stainless steel, aluminum or plastic) include polyurethanes, polysulfides and fluorocarbon elastomers. When applied to rigid substrates, traditional corrosion-resistant coatings such as fluorocarbon elastomers have been found to provide excellent resistance to oil and fuel. However, when applied to flexible elastomeric substrates comprising natural rubber and/or diene-type elastomers and mixtures, the fluorocarbon elastomers suffer from poor fatigue resistance, poor low temperature characteristics, and poor adhesion to these substrates.

U.S. Pat. No 4,774,288 discloses a hydrogenated copolymer of a conjugated diene and an α,β—unsaturated nitrile containing an active phenol-formaldehyde resin vulcanization system. The disclosure is directed to the bulk vulcanizate, which is characterized as having good compression set properties and a good resistance to oils and good resistance to oxidative attack in air at elevated temperature aging under oxidizing conditions, however no mention is made suggesting coatings could be formed on flexible elastomeric substrates such as natural rubber and polybutadiene which might provide useful properties.

U.S. Pat. No. 5,314,741 discloses a coating composition including a latex of highly saturated polymer such as hydrogenated nitrile rubber, highly saturated styrene/butadiene copolymer, hydrogenated polybutadiene, or hydrogenated styrene/vinyl pyridine/butadiene terpolymer. The coating is applied to a substrate and cured in place to yield a desired coated article reportedly resistant to ozone, oxygen, and UV light. Suitable curatives taught are zinc-sulfur cure packages. Elevated temperatures are utilized to affect curing of these coatings. Moreover, conventional vulcanizing systems high in sulfur content and low vulcanization accelerator content, or semi-efficient vulcanizing system having a moderate dosage of sulfur and vulcanizates accelerator known to the expert, and described e.g. in W. Hofmann, Kautschuk-Technologie, Genter Verlag, Stuttgart, 1980 p. 64 and 254–255 have several drawbacks. Conventional vulcanizing systems resulting in vulcanizates with good resistance to dynamic stresses (flex life) are very sensitive to aging and reversion. Semi-efficient vulcanizing systems usually give vulcanizates which have a less of a resistance to dynamic stresses (flex life), but, in return, they are somewhat more stable to aging and reversion (cf. R. N. Datta and W. F. Helt, Rubber World, August 1997, p. 24, et seq.) It has also been observed by the present inventors that coatings based on highly saturated elastomers utilizing vulcanizing chemistry suffer from loss of adhesion to substrates such as blends of natural rubber and diene elastomers widely used in rubber articles in the aforementioned articles, especially tires, hoses and the like. A need exists for an improved protective coating for flexible elastomeric substrates which provide improved adhesion to the surface of elastomers, and improved flex-resistance.

U.S. Pat. No. 5,314,955 discloses a coating composition consisting of (a) a hydrogenated acrylonitrile-butadiene copolymer, (b) a phenolic resin, (c) a curing component, and (d) a solvent. This coating solves many of the problems of adhesion to rubber substrates combined with fatigue resistance and fuel resistance. One of the drawbacks of this coating composition is that it requires a high temperature bake to cure the coating and to promote adhesion to adjacent metal surfaces. A high temperature bake requires heat soaking of the entire article to be coated. Some parts such as helicopter rotor bearings would be damaged by a high temperature bake, therefore coatings such as taught in '955 are not practical to apply. The high temperature bake is also costly in production since it adds a time delay and additional handling of the parts. There still exists a need for improved protective coatings for flexible elastomeric substrates comprising typical natural rubber and/or diene-type elastomers that are resistant to fatigue over a broad temperature range, and that exhibit effective adhesion to the substrate, and that can be cured at room temperature if this is a limiting factor in coating an article.

SUMMARY OF THE INVENTION

The coating composition of the invention is resistant to fatigue over a broad operating temperature range, resists degradation on long-term exposure to high temperatures and provides for excellent adhesion to flexible elastomeric substrates. The coating composition can be cured at room temperature as well as elevated temperatures. In the cured state, the coating exhibits at least about 50% elongation, and more typically can be elongated to 100% without loss of adhesion to the elastomer substrate. In one embodiment, the coating composition of the invention initially comprises (A) a functionalized hydrogenated acrylonitrile-butadiene copolymer, (functionalized HNBR) (B) a curing component which contains at least one isocyanate group, preferably a polyisocyanate, or at least one isocyanate group and a group which forms crosslinks, and (C) a solvent. It is an important aspect of the present invention that the solvent of the coating composition can be either water based or hydrocarbon based. The preferred aqueous coatings are substantially free of any volatile organic compound (VOC).

The coating compositions of the present invention can be applied to an elastomeric substrate either prior or subsequent to vulcanization of the substrate. In one aspect, the present invention sets forth a method for coating a substrate comprising applying the above-noted coating to a surface of an unvulcanized rubber substrate and drying the coating at elevated temperature, or preferably ambient conditions.

In another aspect, there is a method for coating a substrate comprising applying the aforementioned solvent-based coating to the surface of a vulcanized rubber substrate which is optionally bonded to metal, drying the coating and allowing the dried coating to cure at ambient conditions, optionally with application of heat. When necessary, it is preferred to provide the coating also onto the portion of exposed metal around the periphery of the elastomer.

The present invention provides coatings, preferably exterior coatings for shaped or molded articles, elastomeric materials and elastomer-metal composites with excellent adhesion to the elastomer substrate, resistance to corrosive materials, resistance to heat build-up, and resistance to flex-fatigue over a wide temperature range. Furthermore, the solvent or aqueous coating compositions can be formulated to enhance the aesthetic features of the substrate such as by providing a desired transparency, gloss, or color thereto. For example, elastomeric articles such as tires, bumpers, hoses and other exposed articles can be coated to provide a durable glossy "wet" look, in black or selected color(s) other than black, such as to match or coordinate with selected color schemes, or applied in multicolor patterns such as for a camouflage appearance when applied thereto and cured.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
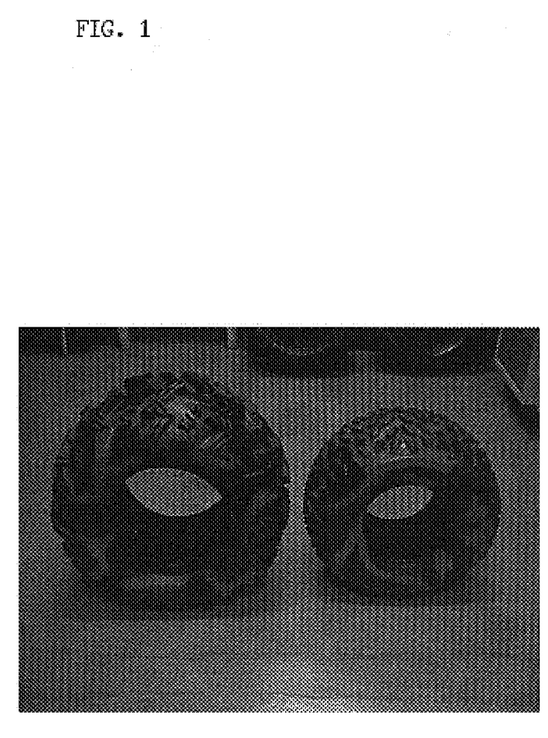
FIG. 1 is a photograph of a camouflage multi-colored coated tire

Functionalized hydrogenated diene copolymer used herein are solid phase, high polymers, with a molecular weight of about 100,000 and higher, more typically 200,000 to 500,000. These polymers are distinguished from liquid, functionalized oligomers, such as well-known reactive terminal-group functional polymers ATBN and CTBN. The unsaturated functionalized polymer for preparing the hydrogenated coating polymer comprises broadly, from 50 to 85 percent by weight of conjugated diene monomer units, 5 percent to 50 percent by weight one or more non-conjugated, ethylenically unsaturated monomer units, and 1 to 20 percent by weight of a functional comonomer or graft-linked compound. The preferred conjugated diene monomer units are derived from 1,3-butadiene monomer, and the non-conjugated ethylenically unsaturated monomer units are derived from one or more ethylenically unsaturated monomers selected from unsaturated nitriles such as acrylonitrile and methacrylonitrile, and monovinyl aromatic hydrocarbons such as styrene and alkylstyrenes. Divinyl aromatic hydrocarbons such as divinyl benzene, dialkenyl aromatics such as diisopropenyl benzene are preferably absent. Other comonomers include alkyl (meth) acrylates such as methyl acrylate, methyl methacrylate, ethyl acrylate, butyl acrylate, 2-ethylhexyl acrylate or methacrylate, vinylpyridine, and vinyl esters such as vinyl acetate. The preferred functional comonomers are selected from unsaturated carboxylic acids and esters thereof such as acrylic acid, methacrylic acid, crotonic acid, itaconic acid, and maleic acid. The glass transition temperature of the functionalized diene elastomer must not exceed $-10°$ C., preferably $-25°$ C. in order to provide acceptable flex-cracking resistance. The functionalized diene elastomer will be described as follows with respect to the most preferred embodiment as a functionalized butadiene acrylonitrile copolymer but applies equally to preparation of the myriad other suitable functionalized diene copoplymers in light of the teachings herein. Nitrile elastomers offer beneficial characteristics such as low temperature flexibility, oil, fuel and solvent resistance as well as good abrasion and water-resistant qualities, making them suitable for use in a wide variety of coating applications in accordance with the invention.

HNBR

The present invention is most preferredly carried out with a functionalized hydrogenated nitrile rubber. The functionalization of HNBR with reactive functionality provides critical enabling methods for crosslinking the coating composition and obtaining the essential level of adhesion to the elastomer substrates. Without adequate adhesion to the elastomer substrate, coatings exhibit premature flex-cracking and/or delamination . The functional groups can be generally classified as containing active hydrogen groups, ethylenic unsaturated groups or hydrolyzable groups. Crosslinking can be effected through the addition of crosslinking components mentioned herein, by exposure to moisture, heat (infra-red, thermal), by UV radiation, or by e-beam radiation. Depending on the reactive functionality incorporated into the diene copolymer copolymer, some functionalized HNBR embodiments mentioned herein below are self-curing without added crosslinker, and all can be cured with suitable crosslinking components added to the functionalized HNBR such as but not limited to dinitrosobenzene, ZnO, gamma-POM, resoles, multifunctional amine, isocyanates, acrylates, dicyandiamide , dicarboximides, and formaldehyde (or UF, MF) resins.

The term "functionalized" means that a comonomer or graft-linked compound is incorporated in or covalently bonded to the polymer structure, and provides a group capable of reacting with a crosslinker such as a diisocyanate. Functionalized HNBR can be prepared by a variety of ways known in the art including: (1) Functionalization of NBR using metathesis, followed by hydrogenation of the modified NBR to give functionalized HBNR and (2) the reaction of NBR with methylolated phenols followed by hydrogenation of the modified NBR to give functionalized HBNR. Functional groups can be incorporated by the use of functional-group-containing comonomers and graft-linkable, functional-group-bearing compounds. Various known isocyanate-reactive functional groups can be utilized. Hydroxy-functional comonomers are readily adaptable. Carboxy-functional comonomers are readily adaptable to form a copolymer of carboxylated hydrogenated nitrile rubber. For the purposes of the present invention, the functionalized hydrogenated nitrile rubber can be defined as a polymer comprising at least one diene monomer, nitrile monomer, and a functional group-bearing comonomer which has been polymerized into the backbone of the polymer or graftlinked functional group containing compound or a combination thereof. When the abbreviation HNBR is utilized herein, it is to be understood that the term refers to rubbers which can include diene monomer other than 1,3 butadiene, and comonomers other than acrylonitrile, unless specifically stated. It is also important to note that additional monomers can be polymerized along with or grafted to the diene monomer to form the functionalized HNBR. The additional monomers can, for example, provide at least one functional group to facilitate crosslinking.

Functionalization of HNBR with phenol functionality can be carried out with the unsaturated un-hydrogenated polymer by addition of methylol phenol under heat and optionally catalyzed by suitable Lewis acid . Addition can be through the nitrile or carboxyl groups by ester formation, or addition at allylic sites. Preferably a metathesis reaction of an ethylenic unsaturated compound bearing a phenol group can be done in solvent or water. Alternatively, an olefinic bearing methylolated phenol can be metathesized with NBR, followed by hydrogenation. The phenol functionalized NBR is subsequently hydrogenated. A methylolation reaction can be undertaken using a phenol functional NBR or HNBR with formaldehyde to generate a methylolated phenol functionality in the NBR, or with HNBR. Methylolated phenols can form covalent bonds with NBR and NBR copolymers by a variety of chemical reactions as reported in the literature. See, A. Knop and L. Pilato, "Phenolic Resins Chemistry and Applications and Performance" Springer-Verlag, New York 1985, Chapter 19, 288–297. The following structural diagrams illustrate functionalizing with a phenolic bearing compound.

While it is possible to combine any methylolated phenol with NBR, mono-methylolated phenols are especially preferred. The combination of Mono-methylolated phenols with NBR polymers yields phenol functionalized-NBR products which are stable. After hydrogenation of the phenol-modified NBR according to known procedures in the art (e.g. cat. hydrogenation), a stable phenol-modified HNBR copolymer is obtained. The phenol-functionalized HNBR copolymer can be crosslinked with a variety of well-known crosslinkers for phenolic resins including those selected from the class of chemical compounds dicarboximides, isocyanate, and formaldehyde source (paraformaldehyde, gamma-POM, hexamethylene amine, phenolic resoles or etherified phenols).

Phenol functionalized HNBR firstly to prepare a phenol functional polymer via a phenol monomer with methylolated phenol functionalized NBR/HNBR can be prepared by known procedures in the art. The phenol functionalized NBR/HNBR can be prepared by either the mono-methylolated phenol or by metathesis involving unsaturated monomer with the unsaturated NBR. The methylolated phenol functionalized NBR/HNBR prepared by metathesis utilizes a methylolated phenolic monomer with NBR. These materials are useful not only as coatings in accordance with the present invention, but also as components of elastomer-to-metal adhesives, autodepositing materials, RFL dips, and reactive tougheners (e.g. epoxy adhesives) taking advantage of their unique curing, film-forming, metal adhesion and compatibility properties. Methylolated phenol functionalized NBR/HNBR are capable of self-curing (i.e. without an external curing agent). Methylolated phenol functionalized NBR/HNBR derivatives are capable of curing with other coating components, such as phenolic novolaks, active hydrogen reactive crosslinkers and rubber/elastomer toughening agents. Methylolated phenol functional HNBR can be used with known vulcanizing agents for rubber. The vulcanization reaction is based on the formation of either a quinone methide or a benzylic carbenium that is generated by the thermal or catalytic activation of the methylolated phenols. The quinone methide intermediate reacts by abstraction of allylic hydrogen. Alternatively, methylolated phenols under acidic catalyzed conditions can generate reactive benzyl carbenium ions which will react with unsaturated polymers in the substrate.

When the reactive functional group on the HNBR is phenol, then isocyanate, dicarboximide, formaldehyde source, and resole curing agents are useful for crosslinking the phenol-functionalized HNBR and developing adhesion to the elastomer substrate. Likewise, amine-functionalized HNBR can be crosslinked using isocyanate or dicarboximide, a formaldehyde source, and resoles, as examples. Epoxy functionalized HNBR can be crosslinked and cured with appropriate amines and dicyandiamide components as are well-known in the art of Epoxy adhesives.

Isocyanate functionalized HNBR can be crosslinked or cured by moisture or by the addition of other curative agents such as amine or polyols. Incorporation of the isocyanate as part of the HNBR is particularly desirable because it reduces that amount of free monomeric and therefore volatile isocyanate and its reported health and safety issues. Maleimide functionalized HNBR can be crosslinked either by the addition of a free radical initiator or by Michael addition reactions. Ethylenic unsaturated acrylate-functionalized HNBR is capable of free radical, UV and e-beam curing. Anhydride functional HNBR can be cured using amines and components described in the art for anhydride-epoxy adhesives. Silyl ether and chlorides are moisture curing. Diels-Alder adducts are self-curing or by the addition of known metathesis catalysts.

To provide the ethylenically unsaturated nitrile-conjugated diene rubber with high saturation, the hydrogenation of nitrile rubber is conducted. Generally any of the numerous known processes for hydrogenation can be utilized, including but not limited to, solution hydrogenation and oxidation/reduction hydrogenation. The hydrogenation serves to saturate at least 80% of the unsaturated bonds of the rubber. When the degree of saturation is less than 80%, the rubber's heat resistance is low, The more preferred degree of saturation of the rubber is 95–99.99%.

The preferred conjugated diene monomers useful for preparing the carboxylated acrylonitrile-butadiene copolymers which are further hydrogenated can be any of the well-known conjugated dienes including dienes having from about 4 to about 10 carbon atoms, such as, but not limited to, 1,3-butadiene; 2-methyl-1,3-butadiene, 2,3-dimethyl-1,3-butadiene; 1,3-pentadiene; 1,3-hexadiene; 2,4-hexadiene; 1,3-heptadiene; piperylene; and isoprene, with 1,3-butadiene presently being preferred.

The unsaturated nitrile monomers copolymerized to form a carboxylated acrylonitrile-diene copolymer typically correspond to the following formula:

wherein each A is hydrogen or a hydrocarbyl group having from 1 to about 10 carbon atoms. Examples of A groups include alkyl and cycloalkyl, such as methyl, ethyl, isopropyl, t-butyl, octyl, decyl, cyclopentyl, cyclohexyl, etc., and aryls such as phenyl, tolyl, xylyl, ethylphenyl, t-butylphenyl, etc. Acrylonitrile and methacrylonitrile are the presently preferred unsaturated nitriles.

The HNBR of the present invention also includes functional group containing monomers which are polymerized into the backbone of the HNBR, or functional group containing compounds which have been grafted to the HNBR, or a combination thereof.

Carboxyl group containing monomers are optionally utilized in the rubbers of the present invention. Carboxyl groups are derived from α,β-unsaturated monocarboxylic acid monomers with 3 to about 5 C-atoms such as acrylic acid, methacrylic acid and crotonic acid and/or other known carboxyl group-containing monomers such as, but not limited to α,β-unsaturated dicarboxylic acids with 4 to about 5 or about 6 C-atoms, e.g., maleic acid, fumaric acid, citraconic acid and itaconic acid. The bound unsaturated carboxylic acid may be present in an amount of from about 1 to about 10 weight percent of the copolymer, with this amount displacing a corresponding amount of the conjugated diolefin. Preferably, the monomer is an unsaturated mono- or di-carboxylic acid derivative (e.g., esters, amides and the like). Functions of the carboxyl group containing monomers include serving as a crosslinking site and enhancing adhesion.

Additional, optional functional monomers can be polymerized into the backbone of the HNBR copolymer. Examples of the functional ethylenically unsaturated monomers which are copolymerizable with the nitrile monomers and the conjugated diene monomers are: hydrazidyl-group containing ethylenic unsaturated monomers, amino-group-bearing ethylenic unsaturated monomers, thiol-group bearing unsaturated ethylenic unsaturated monomers, unsaturated carboxylic acids such as acrylic acid, methacrylic acid, itaconic acid and maleic acid and salts thereof, alkyl esters of unsaturated carboxylic acids such as various acrylates, for example methyl acrylate and butyl acrylate; alkoxyalkyl esters of unsaturated carboxylic acids such as methoxy acrylate, ethoxyethyl acrylate, methoxyethyl acrylate, acrylamide, and methacrylamide.

Also suitable as functional comonomers are various classes of monomers such as N,N-disubstituted-aminoalkyl acrylates; N,N-disubstituted-aminoalkyl methacrylates; N,N-disubstituted-aminoalkyl acrylamides; N,N-disubstituted-aminoalkyl methacrylamides; hydroxyl-substituted-alkyl acrylates and hydroxyl-substituted-alkyl methacrylates, N-alkylol substituted acrylamides such as N-methylolacrylamide, N,N'-dimethylolacrylamide and N-ethoxymethylolacrylamide; N-substituted methacrylamides such as N-methylolmethacrylamide, N,N'-dimethylolmethacrylamide and N-ethoxymethylmethacrylamide especially where free radical initiated copolymerization occurs in the presence of an alkylthiol compound having 12 to 16 carbon atoms three tertiary carbon atoms.

Of these polar group-containing vinyl monomers, N,N-disubstituted-aminoalkyl acrylates, N,N-disubstituted-aminoalkyl methacrylates, N,N-disubstituted-aminoalkyl acrylamides and N,N-disubstituted-aminoalkyl methacrylamides are preferable.

As specific examples of N,N-disubstituted-aminoalkyl acrylates, there can be mentioned acrylic acid esters such as N,N-dimethylaminomethyl acrylate, N,N-dimethylaminoethyl acrylate, N,N-dimethylaninopropyl acrylate, N,N-dimethylaminobutyl acrylate, N,N-diethylaminoethyl acrylate, N,N-diethylaminopropyl acrylate, N,N-diethylaminobutyl acrylate, N-methyl-N-ethylaminoethyl acrylate, N,N-dipropylamlnoethyl acrylate, N,N-dibutylaminoethyl acrylate, N,N-dibutylaminopropyl acrylate, N,N-dibutylaminobutyl acrylate, N,N-dihexylaminoethyl acrylate, N,N-dioctylaminoethyl acrylate and acryloyl morpholine. Of these, N,N-dimethylaminoethyl acrylate, N,N-diethyluninoethyl acrylate, N,N-dipropylaminoethyl acrylate, N,N-dioctylaminoethyl acrylate and N-methyl-N-ethylaminoethyl acrylate are preferable.

As specific examples of N,N-disubstituted-aminoalkyl methacrylates, there can be mentioned methacrylic acid esters such as N,N-dimethylaminomethyl methacrylate N,N-dimethylaminoethyl methacrylate, N,N-dimethylaminopropyl methacrylate, N,N-dimethylaminobutyl methacrylate, N,N-diethylaminoethyl methacrylate, N,N-diethylaminopropyl methacrylate, N,N-diethylaminobutyl methacrylate, N-methyl-N-ethylaminoethyl methacrylate, N,N-dipropylaminoethyl methacrylate. N,N-dibutylaminoethyl methacrylate, N,N-dibutylaminopropyl methacrylate, N,N-dibutylaminobutyl methacrylate, N,N-dihexylaminoethyl methacrylate and N,N-dioctylaminoethyl methacrylate. Of these, N,N-dimethylaminoethyl methacrylate, N,N-diethylaminoethyl methacrylate, N,N-dipropylaminoethyl methacrylate, N,N-dioctylaminoethyl methacrylate and N-methyl-N-ethylaminoethyl methacrylate are preferable.

As specific examples of N,N-disubstituted-aminoalkyl acrylamides, there can be mentioned acrylamide compounds such as N,N-dimethylaminomethyl acrylamide, N,N-dimethylaminoethyl acrylamide, N,N-dimethylaminopropyl acrylamide, N,N-dimethylaminobutyl acrylamide, N,N-diethylaminoethyl acrylamide, N,N-diethylaminopropyl acrylamide, N,N-diethylaminobutyl acrylamide, N-methyl-N-ethylaminoethyl acrylamide, N,N-dipropylaminoethyl acrylamide, N,N-dibutylaminoethyl acrylamide, N,N-dibutylaminopropyl acrylamide, N,N-dibutylaminobutyl acrylamide, N,N-dihexylaminoethyl acrylamide N,N-dihexylaminopropyl acrylamide and N,N-dioctylaminopropyl acrylamide. Of these, N,N-dimethylaminopropyl acrylamide, N,N-dlethylaminopropyl acrylamide and N,N-dioctylaminopropyl acrylamide are preferable.

As specific examples of N,N-disubstituted-aminoalkyl methacrylamides, there can be mentioned methacrylamide compounds such as N,N-dimethylaminomethyl methacrylamide, N,N-dimethylaminoethyl methacrylamide, N,N-dimethylaminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-methyl-N-ethylaminoethyl methacrylamide, N,N-dipropylaminoethyl methacrylamide, N,N-dibutylaminoethyl methacrylamide, N,N-dibutylaminopropyl methacrylamide, N,N-dibutylaminobutyl methacrylamide, N,N-dihexylaminoethyl methacrylamide, N,N-dihexylaminopropyl methacrylamide and N,N-dioctylaminopropyl methacrylamide. Of these, N,N-dimethylaminopropyl methacrylamide, N,N-diethylaminopropyl methacrylamide and N,N-dioctylaminopropyl methacrylamide are preferable.

As specific examples of the hydroxy-substituted-alkyl acrylates and hydroxy-substituted-alkyl methacrylates, there can be mentioned hydroxymethyl acrylate, 2-hydroxyethyl acrylate, 2-hydroxypropyl acrylate, 3-hydroxypropyl acrylate, 3-chloro-2-hydroxypropyl acrylate, 3-phenoxy-2-hydroxypropyl acrylate, hydroxymethyl methacrylate, 2-hydroxyethyl methacrylate, 2-hydroxypropyl methacrylate, 3-hydroxypropyl methacrylate, 3-chloro-2-hydroxypropyl methacrylate and 3-phnoxy-2-hydroxypropyl methacrylate. Of these, hydroxymethyl acrylate, 2-hydroxyethyl acrylate, hydroxymethyl methacrylate and 2-hydroxyethyl methacrylate are preferable.

The HNBR copolymers are polymerized by reaction of the any of the aforementioned exemplary conjugated dienes, unsaturated nitrile, and unsaturated functional-group containing comonomers in the presence of a free radical initiator by methods well known to those skilled in the art. Suitable free radical initiators are beyond the scope of this disclosure, and are typically organic oxides, peroxides, hydroperoxides, and azo compounds, etc., such as hydrogen peroxide, benzoyl peroxide, cumene hydroperoxide, di-tert-butyl peroxide, ascaridole, acetyl peroxide, tert-butyl hydroperoxide, trimethylamine oxide, dimethylaniline oxide, isopropylperoxydicarbonate, diisobutylene ozonide, peracetic acid, nitrates, chlorates, perchlorates, azobisisobutyronitrile, etc.

Hydrogenation of nitrile rubber is known to the art and to the literature. For example, a preferred commercially available X-HNBR (carboxylated-HNBR) is made from a carboxylated nitrile-diene copolymer that is hydrogenated in two steps. It is known that the C—C double bonds of the 1,2-vinyl-configured butadiene units in NBR are hydrogenated very rapidly, followed by the 1,4-cis configured units. The 1,4-trans configured butadiene units are hydrogenated comparatively slowly. The NBR products used for hydrogenation are distinguished by a predominant proportion of the 1,4-trans configured double bonds.

In the 2-stage hydrogenation carbon-to-carbon double bonds are first reduced, followed by reduction of the carbon-to-nitrogen bond. As is known in the art, this procedure avoids the gelation of the hydrogenated polymers which may occur if the reduction is carried out in one step. In the first step, a different catalyst may be used, for example, a palladium or ruthenium catalyst. If desired, however, the nitrile groups alone may be reduced by proper choice of the catalyst, leaving unsaturated carbon-to-carbon bonds in the linear polymeric chain. It is possible also to use a combination of noble metal and nickel or cobalt, operating first at a relatively low temperature, then at a higher temperature. Other techniques for hydrogenating acrylonitrile-butadiene copolymers are disclosed in, for example, U.S. Pat. Nos. 4,581,417; 4,631,315; and 4,795,788; the disclosures of which are incorporated herein by reference.

A partly or completely hydrogenated nitrile rubber (HNBR) is also described in several specifications (for example DE-OS No. (German Published Specification) 2,539,132; DE-OS No. (German Published Specification) 3,329,974; DE-OS No. (German Published Specification) 3,046,008 and 3,046,251; and European Patent No. A-111, 412). All of these specifications describe a process for the preparation of a partly or completely hydrogenated NBR which can be vulcanized (for example with the aid of sulphur vulcanization systems or peroxide vulcanization systems). The HNBR is prepared in solution which is later converted into solid rubber.

A hydroxylated rubber is described in U. S. Pat. No. 6,252,008 herein incorporated by reference. The rubber contains in the region of 0.1 to 5 wt. % of bonded hydroxyl groups.

Also, hydrogenation of X-HNBR latex can be carried out by known conventional techniques. A carboxylated NBR polymer latex made conventionally using anionic surfactants is combined with (1) an oxidant selected from the group consisting of oxygen, air and hydroperoxides; (2) a reducing agent selected from hydrazine and hydrates thereof; and (3) a metal ion activator; (b) and heating the mixture to a temperature from 0° C. to the reflux temperature of the reaction mixture. This technique is taught in U.S. Pat. No. 4,452,950, assigned to Goodyear Tire and Rubber Co., herein incorporated by reference.

Furthermore, a hydrogenation process carried out in organic solution is known from U.S. Pat. No. 4,207,409, also incorporated by reference, in which process an NBR polymers manufactured by anionic polymerization, is taken up in solution in the presence of a catalyst mixture comprising a soluble compound of iron, cobalt or nickel, an aluminumorganic compound and water.

The most preferred acrylonitrile-butadiene copolymers are typically hydrogenated to an extent such that the final product has an unsaturation level of from about 1 to 20 mole percent, desirably from about 1 to about 10 or 15 mole percent, and preferably from about 1 to about 5 mole percent.

A suitable carboxylated hydrogenated nitrile rubber X-HNBR is manufactured by Bayer under a trade name of "Therban®", for example Therban KA 8889. X-HNBR may have an iodine value of preferably about 50% or less, more preferably about 3 to 40%, most preferably from about 8 to 30%. Resistance against heat and demanding solvents can be increased when X-HNBR having a iodine value of 50% or less (high hydrogenation ratio) is used, and rubber elasticity at a low temperature can be maintained by the use of the X-HNBR rubber having a low hydrogenation ratio. The central value of the nitrile content of HNBR is preferably from about 15 to 60%, more preferably from about 30 to 55%, most preferably from about 40 to 50%. Resistance against solvents can be increased by the use of HNBR having a nitriTe content of about 15% or more, particularly about 30% or more, and low-temperature resistance can be kept by the use of the rubber having a nitrile content of about 60% or less, particularly about 50% or less. In addition, its Mooney viscosity as the central value of $ML_{1+4}$ (100° C.) (hereinafter referred to as "Mooney viscosity") is preferably from about 40 to 100, and for a coating, lower Mooney viscosity of 40–60 is preferred. When X-HNBR having a Mooney viscosity falling within this range is used, the coating composition exhibits high resistance against organic liquids and good flexibility and low-temperature resistance.

The HNBR of the present invention can also have crosslinker reactive functional groups graft-linked thereto; either before or after hydrogenation. As examples of the unsaturated compound having a functional group, may be mentioned vinyl compounds having a functional group, and cycloolefins having a functional group. The introduction of the functional group by the graft-modifying method can be carried out by reacting the HNBR with a functional group-containing unsaturated compound in the presence of an organic peroxide. No particular limitation is imposed on the functional group-containing unsaturated compound. However, epoxy group-containing unsaturated compounds, carboxyl group-containing unsaturated compounds, hydroxyl group-containing unsaturated compounds, silyl group-containing unsaturated compounds, unsaturated organosilicon compounds, etc. are mentioned for reasons of improvements of crosslinking density and adhesion to substrates at a low modification rate.

Examples of the epoxy group-containing unsaturated compounds or epoxy group-containing cycloolefins include glycidyl esters of unsaturated carboxylic acids such as glycidyl acrylate, glycidyl methacrylate and glycidyl p-styryl-carboxylate; mono- or polyglycidyl esters of unsaturated polycarboxylic acids such as endo-cis-bicyclo[2,2,1]hept-5-ene-2,3-dicarboxylic acid and endo-cis-bicyclo[2,2,1]hept-5-ene-2-methyl-2,3-dicarboxylic acid; unsaturated glycidyl ethers such as allyl glycidyl ether, 2-methyl-allyl glycidyl ether, glycidyl ether of o-allylphenol, glycidyl ether of m-allylphenol and glycidyl ether of p-allylphenol; and 2-(o-vinylphenyl)ethylene oxide, 2-(p-vinylphenyl)ethylene oxide, 2-(o-allylphenyl)-ethylene oxide, 2-(p-allylphenyl) ethylene oxide, 2-(o-vinylphenyl)propylene oxide, 2-(p-vinylphenyl)propylene oxide, 2-(o-allylphenyl)propylene oxide, 2-(p-allylphenyl) propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide and allyl-2,3-epoxycyclopentyl ether. These epoxy group-containing unsaturated compounds may be used either singly or in any combination thereof.

As examples of the carboxyl group-containing unsaturated compounds, may be mentioned compounds described in Japanese Patent Application Laid-Open No. 271356/1993, for example, unsaturated carboxylic acids such as acrylic acid, methacrylic acid and .alpha.-ethylacrylic acid; and unsaturated dicarboxylic acid such as maleic acid, fumaric acid, itaconic acid, endo-cis-bicyclo-[2.2.1]hept-5-ene-2,3-dicarboxylic acid and methyl-endo-cis-bicyclo [2.2.1]hept-5-ene-2,3-dicarboxylic acid. Further, as examples of the unsaturated carboxylic acid derivatives, may be mentioned anhydrides, esters, halides, amides and imides of unsaturated carboxylic acids, and specific examples thereof include acid anhydrides such as maleic anhydride, chloromaleic anhydride, butenylsuccinic anhydride, tetrahydrophthalic anhydride and citraconic anhydride; esters such as monomethyl maleate, dimethyl maleate and glycidyl maleate; and malenyl chloride and maleimide. Of these, unsaturated dicarboxylic acids and anhydrides thereof are preferred for reasons of easy introduction of the functional group by a graft reaction, and the like, with acid anhydrides such as maleic anhydride and itaconic anhydride being particularly preferred.

Examples of the hydroxyl group-containing unsaturated compounds include allyl alcohol, 2-allyl-6-methoxyphenol, 4-allyloxy-2-hydroxybenzophenone, 3-allyloxy-1,2-propanediol, 2-allyldiphenol, 3-buten-1-ol, 4-penten-1-ol and 5-hexen-1-ol.

Examples of the silyl group-containing unsaturated compounds include chlorodimethylvinylsilane, trimethylsilylacetylene, 5-trimethylsilyl-1,3-cyclopentadiene, 3-trimethylsilylallyl alcohol, trimethylsilyl methacrylate, 1-trimethylsilyloxy-1,3-butadiene, 1-trimethylsilyloxycyclopentene, 2-trimethylsilyloxyethyl methacrylate, 2-trimethylsilyloxyfuran, 2-trimethylsilyloxypropene, allyloxy-t-butyldimethylsilane and allyloxytrimethylsilane.

Examples of the unsaturated organosilicon compounds include trisalkoxyvinylsilanes such as trimethoxyvinylsilane, triethoxyvinylsilane, tris(methoxyethoxy)vinylsilane. The alkoxy groups in such an unsaturated organosilicon compounds can be hydrolyzed into silanol groups.

The graft-modified HNBR according to the present invention can be obtained by graft-reacting one of the aforementioned ethylenic unsaturated compounds having a functional group with the HNBR under generation of a radical. As methods for generating the radical, may be mentioned (i) a method making use of an organic peroxide, (ii) a method making use of a photo-induced radical generator, (iii) a method by irradiation of energy rays, and (iv) a method by heating.

(i) Method making use of an organic peroxide: As the organic peroxide, for example, organic peroxides, organic peresters, etc. may be preferably used. As specific examples of such an organic peroxide, may be mentioned benzoyl peroxide, dichlorobenzoyl peroxide, dicumyl peroxide, di-tert-butyl peroxide, 2,5-dimethyl-2,5-di(peroxide benzoate) hexyne-3, 1,4-bis(tert-butyl peroxyisopropyl)benzene, lauroyl peroxide, tert-butyl peracetate, 2,5-dimethyl-2,5-di(tert-butyl peroxy)hexyne-3, 2,5-dimethyl-2,5-di(tert-butyl peroxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate. In the present invention, azo compounds may also be used as the organic peroxides. As specific examples of the azo compounds, may be mentioned azobisisobutyronitrile and dimethyl azoisobutyrate.

Of these, benzoyl peroxide, and dialkyl peroxides such as dicumyl peroxide, di-tert-butyl peroxide, 2,5-dimethyl-2,5-di(tert-butyl peroxide)hexyne-3, 2,5-dimethyl-2,5-di(tert-butyl peroxy)hexane and 1,4-bis(tert-butyl peroxyisopropyl) benzene are preferably used.

These organic peroxides may be used either singly or in any combination thereof. A proportion of the organic peroxide used is generally within a range of 0.001 to about 10 parts by weight, preferably about 0.01 to about 5 parts by weight, more preferably about 0.1 to about 2.5 parts by weight per 100 parts by weight of the unmodified HNBR. When the proportion of the organic peroxide used falls within this range, the rate of reaction of the functional group-containing unsaturated compound, and various properties of the resulting functional group-containing polymer, are balanced with one another at a high level. It is hence preferable to use the organic peroxide within such a range.

No particular limitation is imposed on the graft-modifying reaction, and the reaction may be carried out in accordance with any of the methods known per se in the art. The graft reaction can be conducted at a temperature of generally 0 to 400° C., preferably 60 to 350° C. The reaction time is generally within a range of 1 minute to 24 hours, preferably 30 minutes to 10 hours. After completion of the reaction, a solvent such as methanol is added in a great amount to the reaction system to deposit a polymer formed, and the polymer can be collected by filtration, washed and then dried under reduced pressure.

(ii) Method making use of a photo-induced radical generator: The method making use of the photo-induced radical generator is a method in which after the photo-induced radical generator is added, the resultant mixture is exposed to ultraviolet light to generate a radical, and any conventionally known method may be used. The photo-induced radical generator may be any substance so far as it is activated by irradiation of ultraviolet light. Specific examples thereof include carbonyl compounds such as benzoin, benzoin methyl ether, benzoin isopropyl ether, benzoin isobutyl ether, acetoin, butyroin, toluoin, benzyl, benzophenone, 2,2-dimethoxy-2-phenylacetophenone, alpha-hydroxycyclohexyl phenyl ketone, p-isopropyl-.alpha.-hydroxyisibutylphenone, alpha, alpha-dichloro-4-phenoxyacetophenone, methylphenyl glyoxylate, ethylphenyl glyoxylate, 4,4-bis(dimethylaminophenone) and 1-phenyl-1,2-propandione-2-(o-ethoxycarbonyl).oxime; sulfur compounds such as tetramethylthiuram monosulfide and tetramethylthiuram disulfide; azo compounds such as azobisisobutyronitrile and azobis-2,4-dimethylvaleronitrile; peroxide compounds such as benzoyl peroxide and di(t-butyl) peroxide; acylphosphine oxides such as 2,4,6-trimethylbenzoyldiphenylphosphine oxide.

A proportion of the photo-induced radical generator used is generally within a range of 0.001 to about 10 parts by weight, preferably about 0.01 to about 5 parts by weight, more preferably about 0.1 to about 2.5 parts by weight, in terms of a charged proportion upon the reaction, per 100 parts by weight of the unmodified HNBR. When the proportion of the photo-induced radical generator used falls within this range, the rate of reaction of the functional group-containing unsaturated compound, and various properties of the resulting functional group-containing polymer, are balanced with one another at a high level. It is hence preferable to use the photo-induced radical generator within such a range.

(iii) Method by irradiation of energy rays: The method by irradiation of energy rays is a publicly known method in which active energy rays such as alpha-rays, beta-rays and gamma-rays are irradiated to generate a radical. In particular, it is desired that ultraviolet light be used from the viewpoints of efficiency, practicability and profitability.

(iv) Method by heating: The radical generating method by heating is carried out by heating in a temperature range of 100 to 390° C. Both publicly known solution method, and melting and kneading method may be used. Of these, the melting and kneading method using an extruder or the like by which shear stress is applied upon heating is preferred from the viewpoint of reaction efficiency.

Direct modification of carbon-carbon unsaturated bonds in the NBR or HNBR can also be utilized to add functional groups thereto. The carbon-carbon unsaturated bonds are present in the precursor NBR and as residual unsaturation in the HNBR, therefore the modified HNBR according to the present invention can be obtained by modifying the carbon-carbon unsaturated bonds to add a functional group to the addition polymer.

No particular limitation is imposed on the method for introducing the functional group, and examples thereof include (a) a method by oxidation of unsaturated bonds, (b) the afore mentioned method by an addition reaction of a compound containing at least one functional group in its molecule to unsaturated bonds, and (c) the methods mentioned herein of introducing an epoxy group, carboxyl group, hydroxyl group, or aforementioned reaction of an olefinic bond of the NBR or HNBR polymer with an unsaturated, preferably a monounsaturated, carboxylic reactant. Alternatively, the polymer can be halogenated using chlorine or bromine-containing compounds. The halogenated polymer can then be reacted with the monounsaturated carboxylic acid. The polymer and the monounsaturated carboxylic reactant can also be contacted at elevated temperatures to cause a thermal "ene" reaction to take place. Alternatively, the monounsaturated carboxylic acid can be reacted with the polymer by free radical induced grafting. The polymer of the present invention can be functionalized by contact with a hydroxy aromatic compound in the presence of a catalytically effective amount of at least one acidic alkylation catalyst. The alkylated hydroxy aromatic compound can then be further reacted to form a derivative by Mannich Base condensation with an aldehyde and an amine reagent to yield a Mannich Base condensate. In yet another means to functionalize the polymer, the polymer may be contacted with carbon monoxide in the presence of an acid catalyst under Koch reaction conditions to yield the polymer substituted with carboxylic acid groups. In addition to the above methods of functionalization, the polymer of the present invention can be functionalized by methods of air oxidation, ozonolysis, hydroformylation, epoxidation and chloroamination, or the like by any other method (for example, Japanese Patent Application Laid-Open No. 172423/1994).

(B) Curing Component

The curing component contains at least one isocyanate group preferably a polyisocyanate, or at least one isocyanate group and a group that forms crosslinks with the functional groups of the HNBR, or is a polyisocyanate prepolymer, or is a carbodiimide or amino resin. The preferred curing component contains at least one isocyanate group, or a group bearing an isocyanate group, or a functional group reactive crosslinking group, or combinations thereof, and the like. The curing component is used at a level generally of from about 3 to about 30 wt. parts, desirably from about 5 to about 25 wt. parts, and preferably from about 10 to about 20 wt. parts per 100 wt. parts of said hydrogenated copolymer of a conjugated diene, unsaturated nitrile and grafted or copolymerized functional monomers, i.e. functionalized HNBR parts.

Suitable monomeric polyisocyanates include aliphatic diisocyanates containing from 2 to 40 carbons in the aliphatic radical may be used in the present invention. Exemplary polyisocyanates include ethylene diisocyanate, trimethylene diisocyanate, hexamethylene diisocyanate, propylene-1, 2-diisocyanate, ethylidene diisocyanate, cyclopentylene-1, 3-diisocyanate, the 1,2-,1,3- and 1,4-cyclohexylene diisocyanates, the 1,3- and 1,4-phenylene diisocyanates, diphenylmethane diisocyanates, polymethyleneisocyanates, the 2,4- and 2,6-toluene diisocyanates, the 1,3- and 1,4-xylylene diisocyanates, bis(4-isocyanatoethyl) carbonate, 1,8-diisocyanato-p-methane, 1-methyl-2, 4-diisocyanatocyclohexane, the chlorophenylene diisocyanates, naphthalene-1,5-diisocyanate triphenylmethane-4,4', triisocyanate, isopropylbenzene-alpha-4-diisocyanate, 5,6-bicyclo[2.2.1]hept-2-ene diisocyanate, 5,6-diisocyanatobutylbicyclo[2.2.1]hept-2-ene. Exemplary commercial products are trimethylhexamethylene diisocyanate available from VEBA, heptadecyl (C17) diisocyanate, DDI 1410 an aliphatic C-36 diisocyanate available from the Henkel Corporation of Minneapolis, Minn. and Isonate® 143L diisocyanate, a modified diphenylmethane diisocyanate (MDI) available from Upjohn Corp. Further urethane components are isophorone diisocyanate available from VEBA and Desmodur® N an aliphatic triisocyanate available from Mobay. Desmodur® N is more particularly defined as the reaction product of 3 moles of hexamethylene diisocyanate and water having an isocyanate equivalent weight as later defined of 191. Other adducts or prepolymers of the polyisocyanate include Desmodur® L and Mondur® CB which are the adducts of tolylene diisocyanate (TDI).

Examples of alicyclic polyisocyanates include 1,3-cyclopentene diisocyanate, 1,4-cyclohexane diisocyanate, 1,3-cyclohexane diisocyanate, 1-isocyanato-3,3,5-trimethyl-5-isocyanatomethyl-cyclohexane (isophorone diisocyanate, IPDI), 4,4'-methylenebis(cyclohexyl isocyanate), methyl-2, 4-cyclohexane diisocyanate, methyl-2,6-cyclohexane diisocyanate and 1,3- or 1,4-bis(isocyanatomethyl)cyclohexane) and polyisocyanates (e.g., 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1) heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2. 2.1) heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane and 6-(2-isocyanatoethyl)-2-isocyanatomethyl-2-(3-isocyanatopropyl)-bicyclo(2.2.1)heptane).

Blocked isocyanates, which are known, can be employed in the practice of forming the coatings. Any polyisocyanate can be blocked. Suitable blocking agents for reaction with the organic mono- or polyisocyanates are those isocyanate-reactive compounds, for example, phenols, lactams, oximes, imides, alcohols, pyrazoles, and the like. The reaction of the organic polyisocyanate and the blocking agent can be carried out by any of the methods known in the art. The reaction can be carried out in bulk or in inert solvent at temperatures of, for example, about 50–120° C. For completely-blocked isocyanates, equivalent ratios of isocyanate-reactive groups to isocyanate groups of 1/1–2/1 or higher can be utilized. Completely blocked isocyanates are preferredly used herein, but the ratio can be adjusted if only a partially-blocked polyisocyanate is desired.

The preferred monomeric isocyanates for organic solvent solution coatings of the present invention are derived from 1,6-diisocyanatohexane or 1-isocyanato-3,3,5-trimethyl-5-isocyanatomethyl-cyclohexane, and include derivatives such as an isocyanurate group-containing polyisocyanate based on 1,6-diisocyanatohexane and/or 1-isocyanato-3,3,5-trimethyl-5-isocyanatomethyl-cyclohexane, a uretdione group-containing diisocyanate based on 1,6-diisocyanatohexane and/or 1-isocyanato-3,3,5-trimethyl-5-isocyanatomethyl-cyclohexane, a urethane group-containing polyisocyanate based on 1,6-diisocyanatohexane and/or 1-isocyanato-3,3,5-trimethyl-5-isocyanatomethyl-cyclohexane, an allophonate group-containing polyisocyanate based on 1,6-diisocyanatohexane and/or 1-isocyanato-3,3,5-trimethyl-5-isocyanatomethyl-cyclohexane, a biuret group-containing polyisocyanate based on 1,6-diisocyanatohexane, bis-(6-isocyanatohexyl)-oxadiazinetrione and mixtures of these polyisocyanates.

The aqueous coating containing functionalized elastomer and crosslinker dispersed therein can be utilized shortly after preparation, such as by the use of an aqueous dispersed polyisocyanate such as disclosed in U.S. Pat. No. 5,202,377. Exemplary emulsifiable polyisocyanates taught in the '377 patent comprise a hydrophilic tertiary isocyanate functional oligomer rendered hydrophilic by partially reacting with a hydrophilic polyether. Other water dispersible isocyanates suitable for aqueous-based embodiments according to the invention are known. U.S. Pat. No. 4,663,377, teaches an emulsifiable polyisocyanate mixture comprising (a) a hydrophilic isocyanate- functional oligomer and (b) a polyisocyanate. A non-limiting example is the reaction product of an aliphatic polyisocyanate with a mono- or polyhydric, nonionic polyalkylene ether alcohol having at least one polyether chain containing at least 10 ethylene oxide units. Water dispersible isocyanates which are preferred are based upon aliphatic and alicyclic isocyanates.

Coating compositions can be formed by combining (i) the water dispersible crosslinkers, such as carbodiimide, polyisocyanate with (ii) the separate aqueous solutions, emulsions or dispersions of the functionalized elastomer polymer containing functionality. Alternatively, the aqueous composition containing the functionalized elastomer can be combined with a separate aqueous dispersion containing the crosslinker such as is taught in U.S. Pat. No. 5,466,745 for the diisocyanate embodiment. The coating can be prepared by admixing the elastomer in aqueous medium with a non-aqueous, emulsifiable composition comprising an unblocked polyisocyanate crosslinking agent and a surface active isocyanate-reactive material. This alternative will introduce some volatile organic components when selecting solvents known as VOC, however there are other solvent diluents that can be used that are not considered VOC. A known procedure can be followed by (i) admixing an unblocked hydrophobic isocyanate and diluent with a mixture of a surface active isocyanate-reactive material and water to form a water-in-oil emulsion, then (ii) adding this emulsion to the aqueous medium containing the elastomer in proportions and under conditions to invert the isocyanate emulsion into an oil-in-water emulsion.

Polyisocyanates are also discussed in the following U.S. Pat. No.: 4,553,377, and citing U.S. Pat. Nos.: 6,221,995; 6,201,060; 6,153,690; 6,143,132; 6,139,675; 6,126,777; 6,087,439; 6,080,812; 6,051,634; 6,034,169; 6,008,289; 6,007,619 and 5,998,539.

Specific examples of commercial diisocyanates that may be mentioned, are 1,6-hexane diisocyanate (commercially available, for example, under the trade designation HMDI from Bayer), isophorone diisocyanate (commercially available, for example, under the trade designation IPDI from Huls), tetramethylxylene diisocyanate (commercially available, for example, under the trade designation m-TMXDI from Cytec), 2-methyl-1,5-pentane diisocyanate, 2,2,4-trimethyl-1,6-hexane diisocyanate, 1,12-dodecane diisocyanate and methylene bis(4-cyclohexyl isocyanate) (commercially available, for example, Desmodur® W from Bayer), and higher functional isocyanates such as a biuret of 1,6-hexane diisocyanate (commercially available, for example, as Desmodur® N from Bayer), an isocyanurate of 1,6-hexane diisocyanate (commercially available, for example, as Desmodur® N-3390 from Bayer), an isocyanurate of isophorone diisocyanate (commercially available, for example, as Desmodur® Z-4370 from Bayer), a reaction product of tetramethylxylene diisocyanate and trimethylol propane (commercially available, for example, as Cythane® 3160 from Cytec), and a reaction product of one mole of trimethylol propane and 3 moles of toluene diisocyante (commercially available, for example, as Desmodur® L from Bayer). The amount of di- or polyisocyanate included should be from 3 to 30 phr. Preferably the amount is from 8 to 15 phr.

Another class of crosslinking components are the various known isocyanatosilanes which contain an isocyanate group and another group capable of forming crosslinks, such as a hydrolyzable group, namely halogen, hydroxy, alkoxy, or acyloxy group; an epoxy-containing group; a mercapto group; a mercapto-containing group; a vinyl group; a vinyl-containing group; another isocyanate group; another isocyanate-containing group; an ureido group; an ureido-containing group; an imidazole group; or an imidazole-containing group. Such compounds are known in the art.

The preferred crosslink-forming group of the isocyanatosilane is an alkoxy group. Examples of commercially available isocyanato-alkoxy silanes which are suitable herein include gamma-isocyanatopropyltrimethoxysilane, available as Silquest® Y-5187 from OSi Specialties Group, a Witco company (OSi), and gamma-isocyanatopropyltriethoxysilane, available as Silquest® A-1310, also from OSi.

Examples of other suitable curing components are the carbodiimides. The polyfunctional carbodiimides exhibit suitable reactivity with functional group-containing elastomers used in the present invention. N-acylurea groups form between carboxylic sites. Carbodiimide linkages can also be formed between a carboxyl group and other functional groups contained in the functionalized elastomer, such as hydrazidyl, amino and/or thiol groups. Poly functional carbodiimides can be obtained from polyisocyanates using phospholine oxide as catalyst as is described, for example, in U.S. Pat. No. 2,941,966. Water dispersible carbodiimides can be formed by the addition of hydrophilic polyamines or polyols and carbodiimides containing isocyanate groups, by reacting the reactants in the presence of from 0.01 to 3% by weight, based on the reaction mixture, of a Sn catalyst as is taught in U.S. Pat. No. 4,321,394. The re-arrangement products can be produced at temperatures as low as 25–150° C., using such catalysts as tin(II)acetate or dibutyl tin diacetate. The hydroxyl-bearing compounds are preferred hydrophilic groups and include polyols containing from 2 to 8 hydroxyl groups, and especially those having a molecular weight in the range from 800 to 10,000. Exemplary polymeric polyols include for example, polyesters, polyethers, polythioethers, polyacetals. Hydrophillic polyfunctional carbodiimides containing hydrolyzable silane groups with polyfunctional carbodiimides, as is taught in U.S. Pat. No. 5,258,481.

Examples of suitable carbodiimide compounds used in the present invention are N,N'-dicyclohexylcarbodiimide, 1-ethyl-3-(3'-dimethylaminopropyl)carbodiimide, N-ethyl-N'-(3-dimethylaminopropyl)-carbodiimide, N'-diisopropyl-carbodiimide, N'N'-di-tert-butylcarbodiimide 1-cyclohexyl-3-(4-diethylaminocyclohexyl)carbodiimide, 1,3-di-(4-diethylaminocyclo-hexyl)carbodiimide, 1-cyclohexyl-3-(diethylaminoethyl)carbodiimide, 1-cyclohexyl-1-cyclohexyl-3-(2-morphonlinyl-(4)-ethyl)carbodiimide 1-cyclohexyl-3-(4-diethyl-aminocyclohexyl)carbodiimide, and the like. There are a variety of commercially available solvent soluble and water dispersible carbodiimides. Carbodiimide compounds are commercially available from Union Carbide Corp., USA under the UCARLNK® designation.

Amino resins are also curing components and refer to any material in the broad class of materials based on the reaction of formaldehyde with urea, melamine, benzoguanamine, or acetylguanamine. Such compounds are well known and described in, for example, "Kirk-Othmer Encyclopedia of Chemical Technology", 3.sup.rd Ed. Volume 2, pages 440–469, Wiley-Interscience, 1978. Representative examples of such compounds include methylolated melamines; benzoguanamines; acetylguanamines; methylolated ureas such as dimethylolurea, dimethylolethyleneurea, tetramethylolacetylene urea, and dimethylolpropyleneurea; dimethylol derivatives of tetrahydro-5-alkyl-S-triazone; glyoxal resins such as dimethyloldihydroxyethyleneurea (DMDHEU) and tetramethylolglycoluril; methylated derivatives of any of the foregoing; and uron resins such as N,N'-bis(methoxymethyl) uron. Methylolacrylamide and methylolmethacrylamide are also included within the class of amino resins. Although the selection of particular amino resin is based on at least several considerations of coast, availability, ease of incorporation, cure kinetics, the choice is not critical in the practice of the invention. It is preferable to use water insoluble amino resins in aqueous compositions of the invention because they will have a longer shelf life.

(C) Carrier Liquid

The coatings are applied in a carrier liquid. A carrier liquid can be either an organic solvent carrier, or water, predominantly, although minor amounts of one can be contained in the other for introducing materials, co-solvating, dispersing, such that, the carrier can comprise a minor proportion of solvent, or co-solvent along with a major proportion of water, as an example. The coating compositions of the present invention are preferably applied to an elastomeric substrate in the form of a solution using one or more organic solvent carriers. For the purposes of the present invention, the term solvent can broadly be defined as a carrier for the other components of the composition, wherein the solvent is capable of dissolving or maintaining the component in a substantially dispersed state or mixture.

Preferred solvents include water based latexes and/or non-HAP (Hazardous Air Pollutant) or non-VOC, or non-HAP, non-VOC organic solvents.

Non-HAP solvents include methyl acetate, n-butyl acetate, t-butyl acetate, acetone, ethyl acetate, isopropyl acetate, isobutyl acetate, tetrahydrofuran, n-methyl pyrrolidone, aliphatic hydrocarbons such as heptane, dimethylformamide, diisobutyl ketone (DIBK), methyl isoamyl ketone, monochlorotoluene, para-chlorobenzotrifluoride (PCBTF), and vm&p naphtha. A combination of acetone and DIBK is the preferred non-HAP solvent mixture. Acetone, methyl acetate, and para-chlorobenzotrifluoride (PCBTF) alone or in any combination are the preferred solvents for HAP, and VOC compliant coatings . Among the HAP solvents which are photochemically reactive in the atmosphere are hexane, xylene, toluene, MEK, and MIBK. Toluene, xylene, MEK and MIBK are the preferred solvents when HAP and VOC compliance is not critical.

One such category of solvent useful as the carrier vehicle for the coating composition of the present invention can essentially be any organic solvent or other material known to dissolve acrylonitrile-butadiene copolymers. Examples of organic solvents useful in the present invention include ketones such as methylethyl ketone, methylisobutyl ketone, and diisobutyl ketone; acetates such as butyl acetate; toluene, xylene and their derivatives; nitropropane; and ethylene dichloride.

The organic solvent of the present invention is typically utilized at about 70% to about 97% by weight of the total coating composition (solvent, functionalized HNBR, curing component and other optional components, and preferably from about 85% by weight to 95% by weight such that the coating composition has a total nonvolatile solids content ranging from about 3 to about 30% percent, and preferably from about 5 to about 15%.

Often, it is highly desirable and environmentally advantageous to utilize a water based system as a solvent or carrier for the compositions of the present invention. A suitable method for the preparation of a water based latex coating composition is as follows. First, the functionalized HNBR copolymer is dissolved in a suitable solvent. Examples of organic solvents include, but are not limited to, any of the organic solvents listed above, and preferably methyl ethyl ketone, methyl isobutyl ketone, and methyl isopropyl ketone. The solvent, which can be a solvent mixture, preferably has a low water-solubility and optionally forms an azeotrope with water at a solvent content of more than about 50%, or a boiling point below about 95° C., and at least below the boiling point of water. The organic phase is emulsified in water by techniques known in the art using anionic, cationic, nonionic, or amphoteric emulsifiers or methyl cellulose. The aqueous organic solvent mixture is mixed under high shear and a phase inversion takes place wherein water become the continuous phase. The solvent is stripped off, typically by heating below the boiling point of water, and generally below 95° C. The curing component and additional components, if any, are added to the latex, preferably shortly before coating.

An example of a further suitable procedure for preparing an aqueous based latex of a X-HNBR rubber is described in U.S. Pat. No. 4,826,721, herein incorporated by reference. The rubber component is dissolved in a solvent such as 3-chloro-toluene. An emulsifier such as abietic (rosin type) acid derivatives and dehydro abietic acid derivatives is also added. Water was also added to the composition. The composition was emulsified and subsequently the solvent is freed utilizing rotary evaporation, preferably under reduced pressure. X-HNBR latex is also available from Nippon Zeon of Japan.

The aqueous latex coating compositions of the present invention generally have solids content 30 to 50 percent by weight.

The coating compositions of the present invention can be dried or cured to form substantially clear or transparent films when pigments are excluded. Alternatively, optional and preferred dyes or pigments can be readily beincorporated. Colored coatings provided in accordance with the invention provide outstanding color and coating physical properties for long-term weathering uses. An extensive list of organic and inorganic pigments suitable for adding to rubber can be found in the current volume of the Rubber Blue Book, published by Lippincott & Peto Publications and well known to those versed in the art of formulating elastomers. As a brief overview, inorganic pigments such as iron oxide (rust red), chrome oxide (green), titanium dioxide or zinc oxide (white), ultramarine blue, and aluminum powder (silver) are used to make opaque coatings. As little as 1 phr carbon black is sufficient to color the coating black. Organic colors as typically use, can be incorporated for different coloring effects. The non-pigmented organic colorants leave the coating transparent but with a color or shade. These do not provide contrast on carbon-black pigmented elastomer substrates. In order for more intense coloration an organic pigment is combined with a higher opacity pigment. One to five parts by weight per 100 parts by weight of elastomer coating of titanium dioxide or two to 20 phr of aluminum powder works very well. Organic and inorganic pigments can be mixed into the solid polymer using a Banbury mixer or a two-roll mill. The rubber containing the pigment is then dissolved in the solvent. Alternatively, the pigment may be dispersed in the liquid solvent and then added to the solvated polymer blend. This is the preferred method for adding aluminum flakes.

Pigments can generally be defined as any substance that imparts color to another substance or mixture. When utilized within the application, the term pigment encompasses dyes, both natural and synthetic. Pigments can be inorganic and include metallic oxides, metal powder suspension, earth colors, lead chromates, and carbon blacks, or organic including those derived from animal sources, vegetable sources, or synthetic processes. The pigment should be in particle form and should have a mean particle size between about 0.1 and about 100 microns and preferably between about 0.2 and about 50 microns. The most preferred mean particle size for organic pigments is about 0.2 microns. The most preferred mean particle size for inorganic pigments is about 1 to 20 microns.

Examples of organic and inorganic pigments which can be used in this invention include but are not limited to iron blue zinc oxide, titanium dioxide, chrome yellow, carbon black, chrome orange, chrome green, zinc chromate, red lead, lethol red, azo type toners, phthalocyanines, aluminum hydrates, lakes, iron oxide, white lead, extenders, phosphotungstic acid toners, titanium-containing pigments, sulfur-containing pigments, aluminum oxide, lithopane, ultraphone, lead chromate, cadmium sulfide, cadmium selenide, barium sulfate, azo pigments, anthraquinone and vat pigments, phthalocyanine pigments, acrylamino yellow, magnesium oxide, chrome red, antimony oxide, zinc sulfide, magnesium fluoride and ground barytes. Benzoid pigments are useful and examples are toners and lakes. Examples of benzoid toners are yellow toners, e.g., benzoid yellows and Hansa yellows; organe toners, e.g., vat orange 3; red toners, e.g., napthol reds; violet toners; blue toners; green toners; brown toners; and black toners. Examples of benzoid lakes are yellow lakes, e.g., acid yellow 2; orange lakes; red lakes; violet lakes; blue lakes; e.g., acid blue 93; green lakes; brown lakes; and black lakes, e.g., natural black 3. Any desired color shade can be provided by mixtures in known proportions as is well known in the art. Metallic pigments can be used, of which many are known and avialable in powder or flake form, for example aluminum flakes and copper powder.

The functionalized HNBR coating is substantially clear and can be colored with substantially any kind or type of pigments. Any suitable amounts of pigments can be utilized to impart a desired color. In organic pigments such as the oxides or titanium dioxide and metal powders tend to make opaque coatings, while organic colors often leave the coating transparent but with a hue or color. In order to have a color show up on a black background such as with black rubber, opaque pigments are utilized along with organic pigments. Incorporation of the pigments into the composition of the present invention can be performed in a number of ways. Pigments can be mixed into solid polymer utilizing a banbury mixer or a two-roll mill. The rubber containing the pigment can then be dissolved in a solvent. Alternatively, the pigment may be dispersed in a carrier and then added to the solvated polymer blend. As is known, organic and inorganic pigments can be utilized in a wide range of effective amounts, and reference is made to the illustrated non-limiting examples below.

The coating composition of the present invention may contain other optional ingredients such as flatting agents, DNB, ZnO, and QDO, maleimides, antioxidants and particulate reinforcements. Specific examples of particulate reinforcements useful in the invention include carbon black, precipitated silica, and fumed silica. Flatting agents, which are well known to the art, can be utilized in effective amounts to control the gloss of the cured coating and include, but are not limited to, silicates. The optional particulate reinforcement may be utilized in various amounts up to about 50 parts per 100 parts by weight of the functionalized HNBR.

The coating composition may be prepared by simply mixing the ingredients by hand with a spatula or the like or by mechanical mixing or shaking. The coating composition is typically applied to an elastomeric material and/or other substrate by dipping, spraying, wiping, brushing or the like, after which the coating is allowed to dry for a period of time typically ranging from about 30 minutes to 2 hours, preferably from about 45 minutes to 1 hour. The coating composition is typically applied to form a dry layer on the substrate having a thickness ranging from about 0.1 to 5 mils, preferably from about 0.5 to 1.5 mils.

The coating compositions can be applied to substrates which have been vulcanized or to uncured substrates and co-cured therewith, at elevated temperatures if necessary.

The gloss of a cured coated substrate can be manipulated at least by utilizing different amounts of solvent, controlling the evaporation rate and/or incorporating various known pigments and/or flatting agents. It has been found that with respect to organic carrier-based coatings, a relatively quick or rapid evaporation produces a flatter or less glossy surface than a more prolonged cure rate. The cured coatings of the present invention can impart to a substrate a gloss generally from about 3% to about 70% at a 60 degree angle when measured using a Byk-Gardner Micro TRI Glossmeter per ASTM D-523 and D-2457. The desirability on the gloss will vary according to the use, with camouflage colors being desirable at low gloss levels and decorative coatings being desired at medium to high gloss levels. For example, the coating compositions can be beneficially utilized to impart an aesthetically pleasing appearance to a tire sidewall, such as a "wet" look. The resulting gloss of the cured coating can be effectively controlled to produce a desired surface, finish, or appearance on a substrate.

The coating composition will cure within about 2 to 24 hours at room temperature. The cure can be accelerated by exposing the coating to elevated temperatures, but this is not required.

Substrates

Coating compositions of the present invention can be used to coat elastomeric materials, both cured and uncured, preferably on the exterior surface thereof. The coating compositions can also be applied to shaped or molded articles such as those made from thermoplastics or thermosets. The coating composition of the present invention is particularly suitable for coating engine mounting devices which are comprised of vulcanized elastomeric parts that have been bonded to metal parts. The compositions are particularly effective coatings on cured elastomers with limited oil and solvent resistance. Such elastomers include natural rubber, styrene butadiene rubber, polybutadiene rubber, ethylene propylene and ethylene propylene diene rubber, polyisobutylene-isoprene rubber, polychloroprene, low acrylonitrile content (<35%) nitrile-butadiene rubbers; and the like. The coating composition may also be used over rigid substrates such as metals, plastics, ceramics, and composites. Examples of thermoplastic and/or thermosetting substrates include, but are not limited to, polyvinyl chloride, polyolefins such as polyethylene and polypropylene, polyester, polyurethane, polyurea, polyurea rim, fiber reinforced plastics, and cellular vinyl. This is particularly useful for bonded rubber mounts which contain both elastomeric and rigid components.

Further examples of commonly utilized and readily available substrates which can be coated with the compositions of the present invention include, but are not limited to, tires, bumpers, wiper blades, vibration isolators, rubber mounts, rail track pad fasteners, helicopter rotor bearings, chassis mounts, wiper frames, gaskets, heels, shoe soles, printing rolls, belts, hoses, fuel tanks, moldings, facias, and other engineered rubber goods. Generally any elastomeric material can be coated to improve resistance to oils, solvents, oxygen, ozone and UV light.

The coating composition of the present invention can be applied to both sides of a substrate. It is to be understood that occasionally it may be desirable to only coat one side or surface of a substrate. As stated above, it is advantageous to coat the surfaces of a substrate which are exposed to light, air, oils, and solvents. Obviously, surfaces of a substrate which are not in contact with the same do not necessarily have to be coated. The coating preferably is a continuous coating in film form which completely covers the intended surface of a substrate. The coating is sufficiently thick to completely cover the desired surface, but not overly thick to materially alter the mechanical properties of the substrate.

Tire(s) can be coated with a composition of the present invention. It is to be understood that the coating compositions can be utilized to cover the entire outside and/or inside surfaces of a tire. Furthermore, it may also be desired to only coat certain portions of a tire such as the sidewall, tread or the like. Tires generally comprise a tread, a pair of sidewalls which abut the tread in the shoulder regions, a fabric reinforced rubber carcass of generally toroidal shape and one or more plies for supporting the tread and sidewalls, and a circumferential fabric reinforced belt of one or more plies, positioned between the carcass and the tread. Tires generally also include a pair of circumferentially extending bundled wire beads which are substantially inextensible, wherein the carcass extends from one bead to the other and the side edges may be wrapped around the beads as shown. Tires may also include a pair of apex components, preferably of a stiff construction and having a triangular cross section in the region of the beads, and a pair of stiff chaffer components which are positioned in the bead region. The above listed components of the tire are conventional, but it is to be understood that additional parts not listed may be included and parts listed above may be omitted. Tires may also include an inner liner which can be applied to the inner surface of the tire to improve air impermeability. Any tire component or components can be coated with the compositions of the present invention. Preferably, the tread and/or sidewall regions are coated.

Preparation of Elastomer Substrate for Coating

The elastomeric surface or substrate to be coated may optionally be pretreated with a chlorinating agent such as sodium hypochlorite and hydrochloric acid. The use of various chlorinating agents to prepare elastomeric materials for application of a coating composition is well known in the art. One example of a chlorinating agent is commercially available from Lord Corporation under the tradename CHEMLOK 7701. The chlorinating agent may be applied to the surface of the elastomeric material by brushing, dipping, spraying, wiping, or the like, after which the chlorinating agent is allowed to dry. Chlorinating agents tend to be very volatile and typically dry within a matter of seconds or minutes.

The coating compositions of the present invention have the surprising ability to form a tenacious bond to flexible elastomeric parts alone, and also to metal components where these are affixed adjacent to the elastomeric part. It is desirable to provide the elastomeric coating over both elastomer and metal so that the boundary between the elastomer and metal can be adequately protected by the coating composition. The present invention is therefore distinguished from many traditional protective coating compositions which only have the ability to bond to one type of substrate to be protected.

The following examples are provided for purposes of illustrating the present invention and shall not be constructed to limit the scope of the invention which is defined by the claims.

EXAMPLE 1

The following example was prepared using Zetpol 2220, an X-HNBR polymer produced by Zeon Chemical having a 36% acrylonitrile content with 5 mol percent unsaturation. A suitable commercial substitute is Therban® KA 8889.

An elastomer coating solution was prepared as follows:

| Ingredient | Description | PHR |
|---|---|---|
| X-HNBR | carboxylated hydrogenated nitrile-butadiene | 100.0 |

This formulation was dissolved in Methyl Isobutyl Ketone (MIBK, CAS No. 108-10-1) to a solids content of 12.0% by weight.

To 40 grams of solution, of bis-[isocyanatopheny]methane (diisocyanate), 53% in xylene was added at 0.1 g, 0.5 g and 1.0 g levels. At 0.1 g. diisocyanate level, the solution cured at room temperature in less than 16 hours. At 0.5 g, the solution cured in 30 minutes.

To 40 grams of solution, 3-isocyanatopropyltriethoxysilane, CAS #24801-88-5, was added at 0.3, 0.7, 1.0, and 1.3 gram quantities. At all levels, the coating composition starts to cure within 45 minutes to one hour and was fully cured in less than 16 hours.

Fuel Resistance Testing

The coatings were tested on a 55 durometer natural rubber compound (A135Q) which had been treated with Chemlok® 7701. The coating was then compared against commercial fluorocarbon coating PLV-2100, and a commercial HNBR SPE XV coating taught according to U.S. Pat. No. 5,314,955 and an uncoated control.

When immersed in Jet A fuel for 24 hours at room temperature, the following volume % swell results obtained are:

| | |
|---|---|
| Control Uncoated | 192.9% |
| Control PLV 2100 | 0.1% |
| Control HNBR SPE XV | 33.6% |
| Example Coating with bis-[isocyanatopheny] methane | 2.2% |
| Example Coating with 3-isocyanatopropyltriethoxysilane | 2.3% |

Adhesion Testing

Rubber adhesion was tested by bonding two one-inch-wide strips together, and by pulling in a 180° peel. The rubber strips were made from a 55 durometer commercial natural rubber compound (A135Q) which had been treated with Chemlok® 7701. An approximate two-inch-long section was coated; each strip was placed in contact with each other and a 472 g weight applied to ensure intimate contact. The weight was left in place for ten minutes. After 8 days drying time, each strip was pulled apart in the Tinius Olsen® tensile tester. The following table records the results.

| Coating Type | Peel Results, Lbf |
|---|---|
| Control PLV 2100 | 2.03 |
| Control HNBR SPE XV | 8.52 |
| Example Coating with bis-[isocyanatopheny] methane | 15.5 |
| Example Coating with 3-isocyanatopropyltriethoxysilane | 21.1 |

Metal adhesion was tested in shear by bonding a one-inch wide rubber strip to a one-inch metal coupon with one square inch of overlap. The rubber strips were made from a 55 durometer natural rubber compound (A135Q) which had been treated with Chemlok® 7701. The metal coupons were 304 stainless steel. Stainless was chosen because it is known to be a difficult substrate to bond to. After coating, each was placed in contact with each other and a 472 g weight applied to ensure intimate contact. The weight was left in place for ten minutes. After 8 days drying time, each specimen was pulled apart in the Tinius Olsen tensile tester.

| Coating Type | Adhesion Results, psi |
|---|---|
| Control PLV 2100 | 16.78 |
| Control HNBR SPE XV | 19.23 |
| Example Coating with bis-[isocyanatopheny] methane | 18.2 |
| Example Coating with 3-isocyanatopropyltriethoxysilane | 18.5 |

Ozone Resistance

Ozone testing was done using a dynamic ozone test (ASTM-D3395) at 50 pphm ozone at 104° F.

Specimens were based on a 55 durometer commercial sulfur-cured natural rubber/polybutadiene blend protected with antiozonant wax and an alkyl-aryl phenylene-diamine antiozonant (M122N). Under dynamic conditions, it appears that the carboxylated hydrogenated coating is more effective as an ozone barrier than the HNBR coating SPE XV.

Cracking Initiated

| | |
|---|---|
| Control Uncoated | 6.5 hrs. |
| Control HNBR SPE XV | 6.5 hrs. |

Example 1 Coating with bis-[isocyanatopheny] methane was uncracked at 28 hrs.

Example 1 Coating with 3-isocyanatopropyltriethoxysilane was uncracked at 28 hrs.

Besides having low adhesion values, the PLV 2100 coating cracks and delaminates from the rubber surface after flexing. Unpierced DeMattia flex specimens (made from a 55 durometer natural rubber compound) were coated with these same coatings and flexed in accordance with ASTM D-813. The PLV-2100 coating was severely cracked and delaminated, exposing the substrate in less than 4000 cycles. Both the baked HNBR SPE XV and Example 1 ran 80,000 cycles at which point the natural rubber substrate was cracked. There was no sign of delamination in either of the Example coatings.

EXAMPLE 2

Demonstrating Solution Coating Gloss Control

A wide degree of gloss control of the functionalized HNBR coatings is obtainable with the present invention coatings. Parameters such as the amount of solvent and cure times can be varied to provide a desired gloss. The example below illustrates achievement in gloss control of the present invention.

Ten grams of X-HNBR polymer Therban KA-8889 from Bayer containing 10% by weight of N762 carbon black, from Cabot Corporation, was dissolved in various solvents. The solvent solution was sprayed onto a cured rubber sheet made from a blend of natural rubber and polybutadiene. After the coating was cured, the gloss was measured at 20°, 60°, and 85° angles using a Byk-Gardner Micro TRI Glossmeter per ASTM D-523 and D-2457.

| | Gloss Units | | |
|---|---|---|---|
| 10 grams polymer/black blend dissolved in the following solvents and cured with 1.2 grams bis[isocyanato phenyl] methane | 20° Angle | 60° Angle | 85° Angle |
| 200 g acetone | 0.5 | 5.9 | 12.5 |
| 185 g acetone, 8 g diisobutylketone (DIBK) | 1.6 | 14.2 | 20.6 |
| 180 g acetone, 20 g DIBK | 5.3 | 30.1 | 43.1 |
| 165 g acetone, 30 g DIBK | 24.9 | 69.6 | 71.6 |
| 180 g acetone, 20 g para-chlorobenzene trifluoride (PCBTF) | 9.7 | 51.1 | 59.7 |
| 150 g methylisobutylketone (MIBK) | 9.8 | 47.6 | 59.8 |
| 100 g acetone, 90 g methyl acetate | 3.8 | 27.3 | 37.7 |

Low gloss camouflage colors were produced by dissolving X-HNBR polymer containing carbon black, chrome green oxide or red iron oxide in acetone. The black version contains 10 parts by weight of N762 carbon black in 100 parts of Therban KA-8889 X-HNBR. The green version contains 30 parts by weight of chrome green oxide in 100 parts of Therban KA-8889 X-HNBR.. The brown version contains 30 parts by weight of red iron oxide and 5 parts by weight of N990 carbon black in 100 parts of Therban KA-8889 X-HNBR.

| 10 grams polymer/color blend dissolved in 200 grams acetone and cured with 1.2 grams Casabond TX | 20° Angle | 60° Angle | 85° Angle |
|---|---|---|---|
| Camouflage black | 0.5 | 5.9 | 12.5 |
| Camouflage brown | 0.8 | 6.7 | 13.3 |
| Camouflage green | 0.4 | 3.3 | 9.3 |

As can be seen from the above examples, a large range of gloss can be produced by the coatings of the present invention. Many different desired glosses can be obtained in generally any desired color. It has been found that gloss of the coating can be increased by incorporating solvents which generally take longer to dry or evaporate. The most volatile solvent, acetone, produced the lowest gloss of the solvents tested. Importantly, as shown above substrates can be coated with the coatings of the present invention to have flat colors, such as camouflage. As can be imagined, these flat colors can be utilized on military vehicles and even ATV tires.

EXAMPLE 3

Functionalized HNBR Water Based Latex

Water based functionalized HNBR latexes were prepared according to the present invention. A 41% solids carboxylated-HNBR latex, 404EXPLTX005 also sold as Latex B from Zeon Chemical was utilized. The following compositions were prepared.

| Components | Formula 1 | Formula 2 | Formula 3 | Formula 4 | Formula 5 | Formula 6 |
|---|---|---|---|---|---|---|
| 41% Solids XHNBR latex | 100 grams | 100 grams | 100 grams | 100 grams | 100 grams | 100 grams |
| Diphenylmethane Diisocyanate prepolymer [1](aromatic) | 1.25 grams | 2.5 grams | 5.0 grams | — | — | — |

-continued

| Components | Formula 1 | Formula 2 | Formula 3 | Formula 4 | Formula 5 | Formula 6 |
|---|---|---|---|---|---|---|
| 1,6-Hexamethylene Diisocyanate based polyisocyanate[2] (aliphatic) | — | — | — | 2.5 grams | 5.0 grams | 7.5 grams |

[1]Desmodur ® XO 672
[2]Bayhydur ® 302 (I,6-HDI) available from Bayer Corporation DeMattia Flex specimens were sprayed with the latex/isocyanate combination as listed above. The DeMattia specimens were wiped with MIBK and treated with Chemlok® 7701, and the coating was applied to the specimens by spraying. All specimens ran 80,000 cycles with no signs of cracking or delamination. Adhesion is excellent.

Ozone testing was done using a dynamic ozone test (ASTM-D3395) at 50 pphm ozone at 104° F.

Specimens were based on a 55 durometer commercial sulfur-cured natural rubber/polybutadiene blend protected with antiozonant wax and an alkyl-aryl phenylene-diamine antiozonant (M122N). Observations were made at 2 hour intervals.

|  | Time to observed edge cracking |
|---|---|
| A. uncoated control | 4.0 hrs. |
| B. coated with Chemisat ® LCH7302X, a non-functionalized HNBR | 2 hours |
| C. coated with Chemisat ® LCH7302X non-functionalized HNBR with 5.0 parts per hundred by weight of Bayhydur ® 302 (1,6-HDI)) | 4.0 hours |
| D. coated with Carboxylated HNBR 404EXPLTX005 | 10 hours |
| E. coated with carboxylated Latex 404EXPLTX005 with 5.0 parts per hundred by weight of I,1,6-HDI | 22.0 hours |

Chemisat LCH7302X is an HNBR Latex currently produced by Zeon Chemical, formerly made by Goodyear Chemical Company.

EXAMPLE 4

Coloration

The pigments may be in powder form as is the case for the green, blue and yellow powders or in a rubber dispersion as is the case for the red masterbatch. Suitable pigments are supplied by Akrochem Corporation. The Alglo® 400 and the aluminum paste 586 are supplied by Toyal America, Inc. and the Stapa® Metallux 214 is supplied by Eckart America L. P. Aluminum Paste 565 and Stapa® Metallux 2156 were also used. Both leafing and non-leafing aluminum pigments of varying particle sizes may can be used to obtain different visual effects. The compounded elastomers were each dissolved in solvent to 10% solids content. They were readily blended to many different color shades conventionally according to the known art of color matching. A blend of 15% Silver3 and 85% Green was mixed to match the body color Dark Caribe Metallic Clearcoat found on a 1998 Pontiac Bonneville and this colored coating was used to coat the tires on said vehicle. On the other hand, a mixture of 90% Silver3 and 10% green gives a silver color with a hint of pastel green. The tires of a silver 1980 Chevrolet Corvette were coated using the Silver1 formulation.

The pigments can also be blended in the initial rubber formulation, Various pastel shades of yellow and blue were made by adding titanium dioxide to the rubber mix.

|  | 4I Pastel Yellow | 4J Pastel Blue1 | 4K Pastel Blue2 |
|---|---|---|---|
| Therban KA-8889 XHNBR | 100 | 100 | 100 |
| Titanium dioxide | 3.0 | 1.0 | 5.0 |
| Akrochem Yellow E-7415 | 5.0 | — | — |
| Akrochem 633 Blue | — | 5.0 | 5.0 |

A blend of copper conductive powder from Caswell with silver2 (Example 4F) gave a metallic gold color. Because the base coating is clear, other color effects such as pearlescent and fluorescent pigments can also be used.

EXAMPLE 5

Control

A control example using a coating cured according to U.S. Pat. No. 5,314,741 of hydrogenated copolymer of acrylonitrile and butadiene in organic solvent using zinc-sulfur curing as taught therein was applied to a peroxide cured natural rubber substrate.

|  | 4A Green | 4B White | 4C Yellow | 4D Blue | 4E Silver1 | 4F Silver2 | 4G Silver3 | 4H Red |
|---|---|---|---|---|---|---|---|---|
| Therban ® KA-8889* | 100 | 100 | 100 | 100 | 100 | 100 | 100 | 100 |
| Akrochem ® E2557 green | 2.5 | — | — | — | — | — | — | — |
| Titanium dioxide | — | 5.0 | — | — | — | — | — | — |
| Akrochem ® Yellow E-7415 | — | — | 5.0 | — | — | — | — | — |
| Akrochem ® 633 Blue | — | — | — | 2.5 | — | — | — | — |
| Alglo ® 400 aluminum paste | — | — | — | — | 10.0 | — | — | — |
| Aluminum Paste 586 | — | — | — | — | — | 12.5 | — | — |
| Stapa ® Metallux 214 alum. paste | — | — | — | — | — | — | 10.0 | — |
| Akrosperse E-4686 Red EPMB | — | — | — | — | — | — | — | 16.0 |

*carboxylated HNBR from Bayer Ag.

| Coating Composition Ingredient | Parts by Weight |
| --- | --- |
| HNBR | 100.00 |
| Zinc Oxide | 4.00 |
| Sulfur | 1.75 |
| ZMBT (2) | 2.00 |
| Zinc dibutyl dithiocarbamate | 0.75 |
| Total | 108.50 |

* Zinc 2-mercaptobenzothiazole accelerator

The ingredients except HNBR were mill mixed and then dissolved to a 10% solution in MIBK solvent. The coating composition was prepared by mixing the solid rubber on a two roll mill followed by dissolving HNBR in solvent. One inch wide specimens of sulfur-cured natural rubber sheet were washed with isopropyl alcohol prior to applying the coating composition.

The coating composition was applied to the surfaces of the natural rubber substrate specimens. The coating thickness was approximately 1 mil dry. Two coated, uncured strips were placed together with the coated sides against each other. The coatings were dried for 24 hours at room temperature. Some of the specimens were baked in an oven for fifteen (15) minutes at 307° F. to cure the coatings. This gave as the product coated natural rubber tensile sheets having thereon coatings, approximately 2 mil thick and bonded together. The bonded specimens were pulled apart in peel and the force required to separate them was recorded.

| Uncured coating (dried but not baked) | 0.6 lbs peel strength |
| --- | --- |
| Cured coating (baked 15 minutes at 307F) | 1.9 lbs peel strength |

These adhesion levels are unacceptably low and not suitable for coating on elastomer substrates subjected to flexing.

While in accordance with the patent statutes the best mode and preferred embodiment have been set forth, the scope of the invention is not limited thereto, but rather by the scope of the attached claims.

What is claimed is:

1. A coated elastomer substrate, comprising:
said substrate having a surface; and
a coating on at least a portion of said elastomer substrate surface, said coating derived from a coating composition comprising (a) a functionalized hydrogenated copolymer comprising at least one repeating unit derived from i) a conjugated diene monomer ii) a non-conjugated ethylenically unsaturated monomer unit derived from one or more ethylenically unsaturated monomers of an unsaturated nitrile or monovinyl aromatic hydrocarbon, and iii) a functional group containing monomer, or graft-linked compound, or combination thereof, said functionalized hydrogenated copolymer has an unsaturation level between about 0.1 and 20 mole percent and (b) a curing component reactive with at least the iii) functional group containing monomer or graft linked compound or combination thereof and comprising at least one group selected from isocyanate group, blocked isocyanate group, isocyanatosilane, amine, silyl ether, silyl chloride, or a carbodiimide group, or a combination thereof, and (c) a solvent.

2. A coated elastomer substrate according to claim 1, wherein said substrate is a tire, bumper, wiper blade, vibration isolator, rubber mount, rail track pad fastener, helicopter rotor bearing, chassis mount, gasket, heel, shoe sole, printing roll, belt, hose, or fuel tank.

3. A coated elastomer substrate according to claim 1, wherein said elastomer substrate is bonded to either metal, a thermoplastic, a thermoset, ceramic, or a combination thereof.

4. A coated elastomer substrate according to claim 3, wherein said elastomer substrate is bonded to metal.

5. A coated elastomer substrate according to claim 3, wherein said substrate is an elastomer.

6. A coated elastomer substrate according to claim 1, wherein said coating composition is colored.

7. A coated elastomer substrate according to claim 1, wherein said coating composition is colored due to the presence of at least one pigment therein.

8. A coated elastomer substrate according to claim 7, wherein said color is black, tan, brown, green, yellow, blue, red, or shades or combinations thereof.

9. A coated elastomer substrate according to claim 1, wherein said coating composition has a solid color, or a random pattern of color.

10. A coated elastomer substrate according to claim 1, wherein said coating composition has a gloss level of from about 3% to about 70% at a 60 degree angle when measured according to ASTM D-523 or ASTM D-2457.

11. A coated elastomer substrate according to claim 1, wherein said substrate is a tire and wherein at least one portion of said surface is at least a portion of a sidewall or a tread, or combinations thereof.

12. A coated elastomer substrate according to claim 1, wherein said conjugated diene is 1,3-butadiene; 2,3-dimethylbutadiene; 1,3-pentadiene; 1,3-hexadiene; 2,4-hexadiene; 1,3-heptadiene; piperylene; or isoprene or combinations thereof, wherein said unsaturated nitrile corresponds to the following formula:

wherein each A, independently, is hydrogen or a hydrocarbyl group having from 1 to about 10 carbon atoms, and wherein said solvent is water, or an organic solvent, or a combination thereof.

13. A method for coating a substrate according to claim 12, wherein said curing component is present in an amount from about 3 to about 30 wt. parts per 100 wt. parts of said functionalized hydrogenated copolymer.

14. A method for coating a substrate according to claim 13, wherein said curing component is present in an amount from about 8 to about 15 wt. parts per 100 wt. parts of said functionalized hydrogenated copolymer.

15. A method for coating a substrate according to claim 13, wherein said curing component is present at from about 5 to about 25 wt. parts per 100 wt. parts of said functionalized hydrogenated copolymer.

16. A method for coating a substrate according to claim 13, wherein the ii) non-conjugated ethylenically unsaturated monomer corresponds to the following formula:

wherein each A, independently, is hydrogen or a hydrocarbyl group having from 1 to about 10 carbon atoms.

17. A method for coating a substrate according to claim 16, wherein the functionalized hydrogenated copolymer comprises from 50 to 85 percent by weight of the i) conjugated diene monomer units, from 5 to 50 percent by weight of the ii) non-conjugated ethylenically unsaturated monomer units, and 1 to 20 percent by weight of the iii) functional group containing monomer or graft linked compound.

18. A method for coating a substrate according to claim 17, wherein said curing component is 1,6-hexamethylene diisocyanate; 1,8-octamethylene diisocyanate; 1,12-dodecamethylene diisocyanate; 2,2,4-trimethylhexamethylene diisocyanate, and the like; 3,3'-diisocyanatodipropyl ether; 3-isocyanatomethyl-3,5,5'-trimethylcyclodexyl isocyanate; hexamethylene diisocyanate; 4,4'-methylenebis(cyclohexyl isocyanate); cyclopentalene-1,3-diisocyanate;cyclodexylene-1,4,-diisocyanate; methyl 2,6-diisocyanatocaprolate; bis-(2-isocyanatoethyl )-fumarate; 4-methyl-1,3-diisocyanatocyclohexane; trans-vinylene diisocyanate; an unsaturated polyisocyanate; 4,4'-methylene-bis(cyclohexylisocyanate) methane diisocyanates; bis-(2-isocyanatoethyl) carbonate N,N',N"-tris-(6-isocyanatohexamethylene)biuret, toluene diisocyanate; xylene diisocyanate; dianisidine diisocyanate; 4,4'-diphenylmethane diisocyanate; 1-ethoxy-2,4-diisocyanatobenzene; 1-chloro-2,4-diisocyanatobenzene; bis(4-isocyanatophenyl)methane; tris(4-isocyanatophenyl)methane; naphthalene diisocyanates; 4,4'-biphenyl diisocyanate; m-phenylene diisocyanate; p-phenylene diisocyanate; 3,3'-dimethyl-4,4'-biphenyl diisocyanate; p-isocyanatobenzoyl isocyanate; tetrachloro-1,3-phenylene diisocyanate; 2,4-toluene diisocyanate,2,6-toluene diisocyanate, 4,4'-isocyanate, bis-[isocyanatopheny] methane polymethylene poly (phenyl isocyanate), or isophrone diisocyanate, or mixtures thereof.

19. A method for coating a substrate according to claim 18, wherein said coating composition includes at least one pigment.

20. A method for coating a substrate according to claim 19, wherein said solvent is acetone, methyl acetate, or parachlorobenzotrifluoride, or any combination thereof.

21. A method for coating a substrate according to claim 20, wherein the conjugated diene is 1,3-butadiene.

22. A method for coating a substrate according to claim 17, wherein said curing component is an organosilane which contains an isocyanate group and another group capable of forming crosslinks.

23. A method for coating a substrate according to claim 22, wherein said another group capable of forming crosslinks is a halogen, hydroxy, alkoxy, or acyloxy group.

24. A method for coating a substrate according to claim 22, wherein said group capable of forming crosslinks is an epoxy-bearing group, a mercapto group, a mercapto-bearing group, a vinyl group, a vinyl-bearing group, another isocyanate group, an isocyanate-bearing group, an ureido group, an ureido-bearing group, an imidazole group or an imidazole-bearing group.

25. A method for coating a substrate according to claim 22, wherein said organosilane is an isocyanate-alkoxy silane.

26. A method for coating a substrate according to claim 22, wherein said coating composition includes at least one pigment.

27. A method for coating a substrate according to claim 26, wherein said solvent is acetone, methyl acetate, or parachlorobenzotrifluoride, or any combination thereof.

28. A method for coating a substrate according to claim 27, wherein the conjugated diene is 1,3-butadiene.

29. A method for coating a substrate according to claim 28, wherein said organosilane is an isocyanate-alkoxy silane.

30. A coated elastomer substrate according to claim 12, wherein said functional group containing monomer is present and is a carboxyl group containing monomer, or an acrylate containing monomer.

31. A coated elastomer substrate according to claim 1 wherein said solvent is selected from methyl acetate, n-butyl acetate, t-butyl acetate, acetone, ethyl acetate, isopropyl acetate, isobutyl acetate, tetrahydrofuran, n-methyl pyrrolidone, aliphatic hydrocarbons such as heptane, dimethylformamide, diisobutyl ketone, methyl isoamyl ketone, monochlorotoluene, para-chlorobenzotrifluoride, and vm&p naphtha, and wherein said curing agent is an isocyanatosilane which contains an isocyanate group and another group capable of forming crosslinks.

32. A coated elastomer substrate according to claim 1 wherein said curing component is an unsaturated organosilicon compound.

33. A coated elastomer substrate according to claim 32 wherein said unsaturated organosilicon compound is a trisalkoxyvinylsilane.

34. A coated elastomer substrate according to claim 33 wherein said trisalkoxyvinylsilane is selected from trimethoxyvinylsilane, triethoxyvinylsilane, tris(methoxyethoxy)vinylsilane.

35. A coated elastomer substrate according to claim 1 wherein said curing component is a silyl group-containing unsaturated compound.

36. A coated elastomer substrate according to claim 35 wherein said silyl group-containing unsaturated compound is selected from chlorod imethylvinylsilane, trimethylsilylacetylene, 5-trimethylsilyl-1,3-cyclopentad iene, 3-trimethylsilylallyl alcohol, trimethylsilyl methacrylate, 1-trimethylsilyloxy-1,3-butadiene, 1-trimethylsilyloxycyclopentene, 2-trimethylsilyloxyethyl methacrylate, 2-trimethylsilyloxyfuran, 2-trimethylsilyloxypropene, allyloxy-t-butyldimethylsilane and allyloxytrimethylsilane.

37. A method for coating an elastomer substrate, comprising:

applying a coating composition to an elastomeric substrate, said coating comprising a solvent, a functionalized hydrogenated copolymer comprising i) at least one repeating unit derived from a conjugated diene monomer, ii) a non-conjugated ethylenically unsaturated monomer unit derived from one or more ethylenically unsaturated monomers of an unsaturated nitrile or monovinyl aromatic hydrocarbon, and iii) an active hydrogen-containing, or ethylenic unsaturated, or hydrolyzable functional group-containing monomer, or graft-linked compound, or combinations thereof, wherein said functionalized hydrogenated copolymer has an unsaturation level between about 0.1 and 20 mole percent, and wherein said coating contains a curing component reactive with at least the iii) active hydrogen-containing, or ethylenic unsaturated, or hydrolyzable functional group-containing monomer, or graft-linked compound, or combinations thereof comprising at least one group selected from an isocyanate group, blocked isocyanate group, isocyanatosilane, amine, silyl ether, silyl chloride, and a carbodiimide group, or a combination thereof, and curing the coating composition by allowing said coating to dry at either ambient or elevated conditions or a combination thereof.

38. A method for coating a substrate according to claim 37, wherein the conjugated diene is 1,3-butadiene; 2,3-dimethylbutadiene; 1,3-pentadiene; 1,3-hexadiene; 2,4-hexadiene; 1,3-heptadiene; piperylene; or isoprene.

39. A method for coating a substrate according to claim 38, wherein the conjugated diene is 1,3-butadiene.

40. A method for coating a substrate according to claim 37, wherein nonconjugated monomer corresponds to the following formula:

wherein each A, independently, is hydrogen or a hydrocarbyl group having from 1 to about 10 carbon atoms.

41. A method for coating a substrate according to claim 40, wherein the unsaturated nitrile is acrylonitrile or methacrylonitrile.

* * * * *